Figure 3:
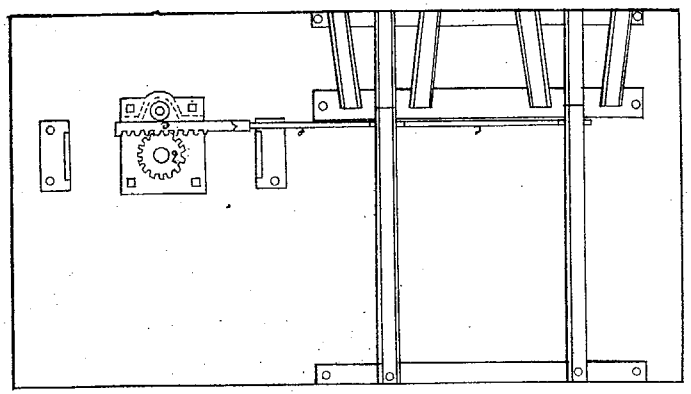

G. R. Smith.

Railway-Switch.

No. 2814

Reissued Dec. 17, 1867

United States Patent Office.

MARIETTE SMITH, OF ITHACA, NEW YORK, ASSIGNEE BY MESNE ASSIGNMENTS OF GEORGE R. SMITH.

*Letters Patent No.* 20,959, *dated July* 20, 1858; *reissue No.* 2,814, *dated December* 17, 1867.

IMPROVED RAILWAY-SWITCH.

The Schedule referred to in these Letters Patent and making part of the same.

TO ALL WHOM IT MAY CONCERN:

Be it known that GEORGE R. SMITH, of Ithaca, Tompkins county, New York, who died May 27, 1859, did obtain Letters Patent of the United States, which bear date of July 20, 1858, for an Improved Railroad-Switch; that on the 9th day of May, 1859, he, the said GEORGE R. SMITH, did assign his whole right and title to the said patent to George W. Randall, as is recorded at the United States Patent Office, July 30, 1859, in liber H 5th, page 422 of transfers of patents; and that on the 12th day of October, 1861, the said Randall did assign the whole right and title to the said patent to the undersigned, MARIETTE SMITH, as is recorded in liber P 9, page 76 of transfers of patents; and that the undersigned, MARIETTE SMITH, of Ithaca, Tompkins county, New York, has surrendered the above-named patent, and hereby declares that she believes the following to be a full and exact description of the invention of the said GEORGE R. SMITH, of an improved railroad-switch, reference being had to the annexed drawings, and to the letters marked thereon.

His object was to make a durable, easily-operated, and effective switch, and for this purpose he used several devices: first, a perpendicular shaft, to which the various parts of the switch are attached; second, by rotating this shaft more or less, any and all the switch, signal, and other changes required of a switch are made; third, at the base of the shaft is placed the mechanical means of changing the movable part or portion of the track, and preferably a rack and pinion as the best device, though, when desirable, other and equivalent means, as a cam, eccentric, crank, or other forms are used; fourth, at a suitable distance from the ground or surface on which the track and switch are laid, the shaft is supported by a frame, so that it shall be firm, and revolve properly; fifth, to this frame, at its upper part, as a convenient place, a circular fixture is attached for the purpose of checking, stopping, and holding the switch at any point or place on it where the switch-change is completed, the said fixture being made a part or a whole of a circle, as most convenient or necessary; sixth, by this check-circle, the lever that rotates the shaft is stopped and held at the places or intervals required by the track-changes, the mechanical means being, preferably, slots in the checking-circle or part of circle, though other means may be and are used; seventh, to the shaft a lever is attached, near the top of the supporting-frame, for the purpose of rotating it, at a place where it is easily in reach of the hand of the operator, and of the checking-segment or circle; eighth, the hand-lever just named, for rotating the shaft, is preferably made a spring-lever, so that it shall the more certainly fall into the slots in the checking-segment or circle, through a hinged lever, or a rigid lever, with a spring snap to it, or an inflexible lever, with a hinged or sliding part or attachment to it, or other similar device, will also fall, or catch, or go into the same slots, holes, or equivalents, stopping and holding-points or places, or intervals, thus doing the same thing virtually in the same manner; ninth, near the top of the shaft are fastened permanent day-signals; tenth, for a night-signal, a lantern is attached, with diverse colors on various sides, to the top of the revolving or rotating shaft, showing by the change of colors the position of the switch; eleventh, to render the misplacement of the night-signals impossible or very inexcusable, the lantern and top of the shaft are made to fit each other only in one way; twelfth, the whole is so arranged that the lever and its holding-segment or checking-circle make the changes, locks, and other variations of signals, track, or other parts, rapidly and with great precision, without the care of the operator being on the various parts of the switch; and by certain parts of the above devices, a small, compact switch is made, and by all of the described devices a very perfect railroad-switch is made. This is apparent in the drawings, which are—

Figure 1:
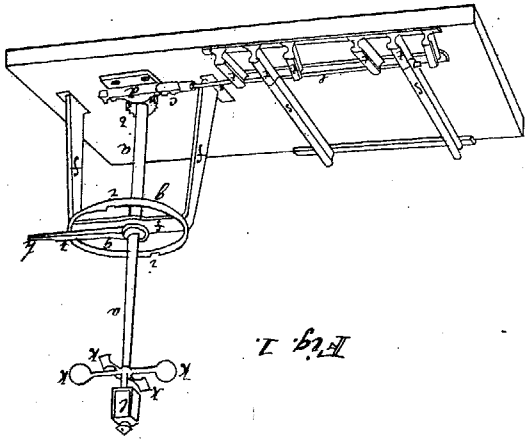

Figure 1, a perspective view of the switch attached to the railroad-track.

Figure 2, a view of the spring-lever and its fastening to the switch-shaft.

Figure 3, a view from above, looking down on the track, and the rack and pinion at the base of the shaft, and a section of the lower part of the switch-frame.

Figure 4:
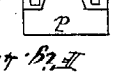

Figures 4 are views of the clamp that confines and covers the rack and pinion.

Figure 6:
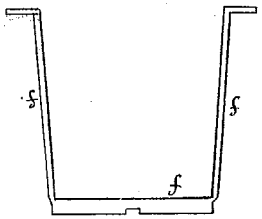
Figure 5:
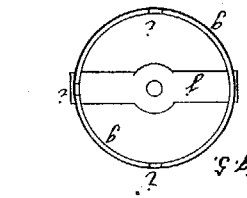
Figure 8:
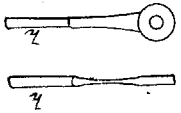

Figure 5, a view of the top of the switch-frame, and the check-circle attached to it, and Figure 6, a side view of the frame of the switch.

In fig. 1, *a a* is the rotating shaft of the switch, and *b* is the pinion, secured to and revolving with the shaft, and *c* is the rack that plays in the pinion, and is attached to the rod *e e* which connects with and clasps the movable ends of the rails of the track, and *f f f* are the frame or support of the shaft and holding-circle or segment, and *g g* the checking, holding, or stopping-segment or circle, and *h* the spring or hand-lever that moves and operates the whole switch, through the shaft, and which hand-lever is regulated and controlled by the check segment or circle; and *i i i* are the slots or stopping-points of the hand-lever, corresponding to the different tracks to which the switch applies; and *k k k k* are the day or permanent signals, of which there may be any suitable number; and *l* is the lantern, with two, four, six, or other convenient number of various-colored glasses, indicating the main or other track as open or closed, as the case may be. In fig. 2, the hand-lever that operates the switch by the rotation of the shaft, in part or wholly, is seen removed, showing both the edge and top of it. In fig. 3, the tracks, rack and pinion, and other parts, are more clearly seen. In fig. 4, the clamp over the rack and pinion, which covers also, when used, a friction-wheel on which the rack moves, is seen by itself. In fig. 5, the top part of the frame or support of the switch-shaft is seen, and the check or holding-segment or circle attached to it. In fig. 6, the side of the frame or support is shown. The other parts and uses of the switch are apparent to those skilled in the art to which it appertains.

*Claim.*

1. I claim the described rack and pinion at the base of a perpendicular rotating or partially rotating shaft, when combined with a spring-lever and a circle or segment of a circle, said lever being fixed at right angles to the said shaft, and playing on said circle or segment, and into slots in the same, and said segment or circle being horizontal.

2. Further, I claim the above-named combination, when further combined with a signal-lantern, which lantern revolves wholly or in part when adjusted to the top of said shaft, said lantern having different-colored glasses, and revolving on an axis drawn perpendicularly through the centre of said lantern.

3. I claim, when in connection with a railroad-switch and adapted thereunto, the construction and arrangement of the shaft *a a*, the hand-lever *h*, and the segment or circle *g g*, as described.

4. The arrangement and adaptation of the segment or circle, hand-lever and shaft just named, to its frame, holding up the shaft *a a*, so that the shaft and hand-lever shall revolve together, and the segment or circle be fixed or stationary about the shaft, as described.

5. The construction of the segment *g g*, with slots to receive the lever *h* at the places or points requisite for the switch-changes, as described.

6. The construction of the hand-lever *h* so as to be self or readily operated by its spring at the just-named places or points of switch-changes in the said segment, as described.

7. The combination, with the shaft *a a*, hand-lever *h*, and segment or circle *g g*, of the rack and pinion *b c*, rod *e e*, and changeable track or tracks, as described.

MARIETTE SMITH,
*Assignee of whole Right and Title of the late George R. Smith.*

Witnesses:
S. J. PARKER,
F. J. McELHENY.